July 2, 1940.   J. P. O'HERN   2,206,614
POWER HACK SAW
Filed Aug. 5, 1939   2 Sheets-Sheet 1
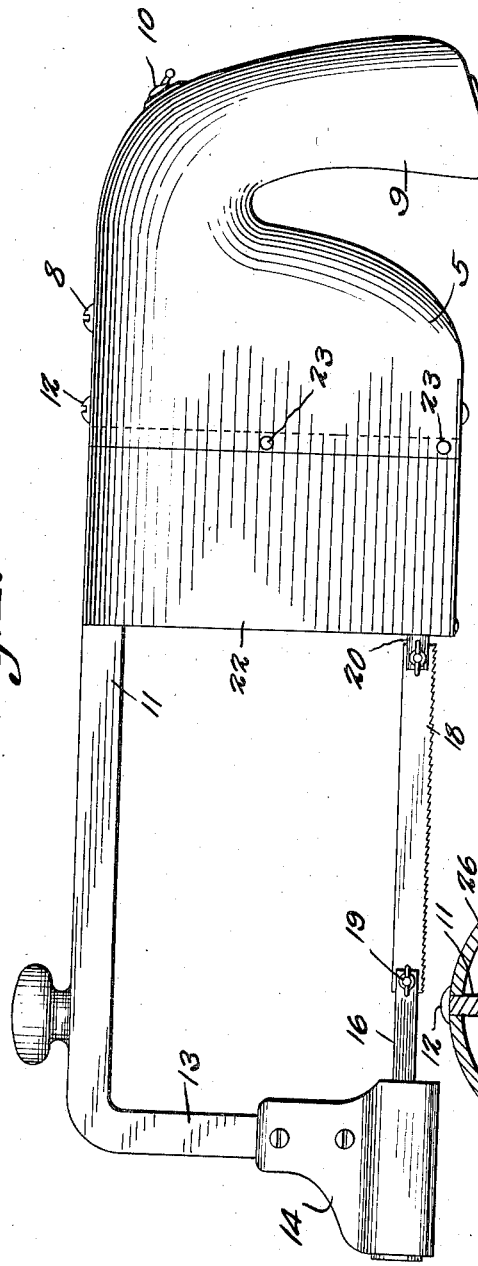
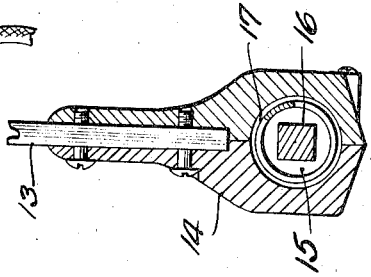
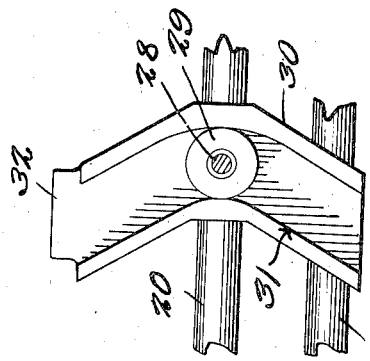
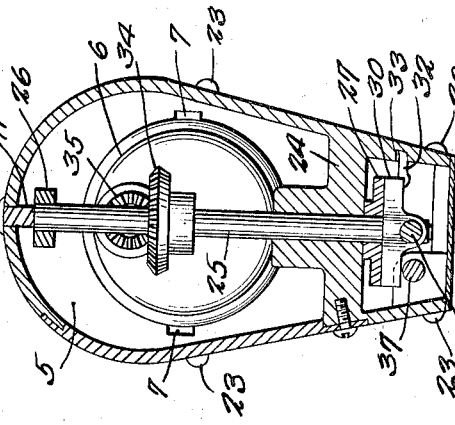
John P. O'Hern
INVENTOR.
BY CA Knowles
ATTORNEYS.

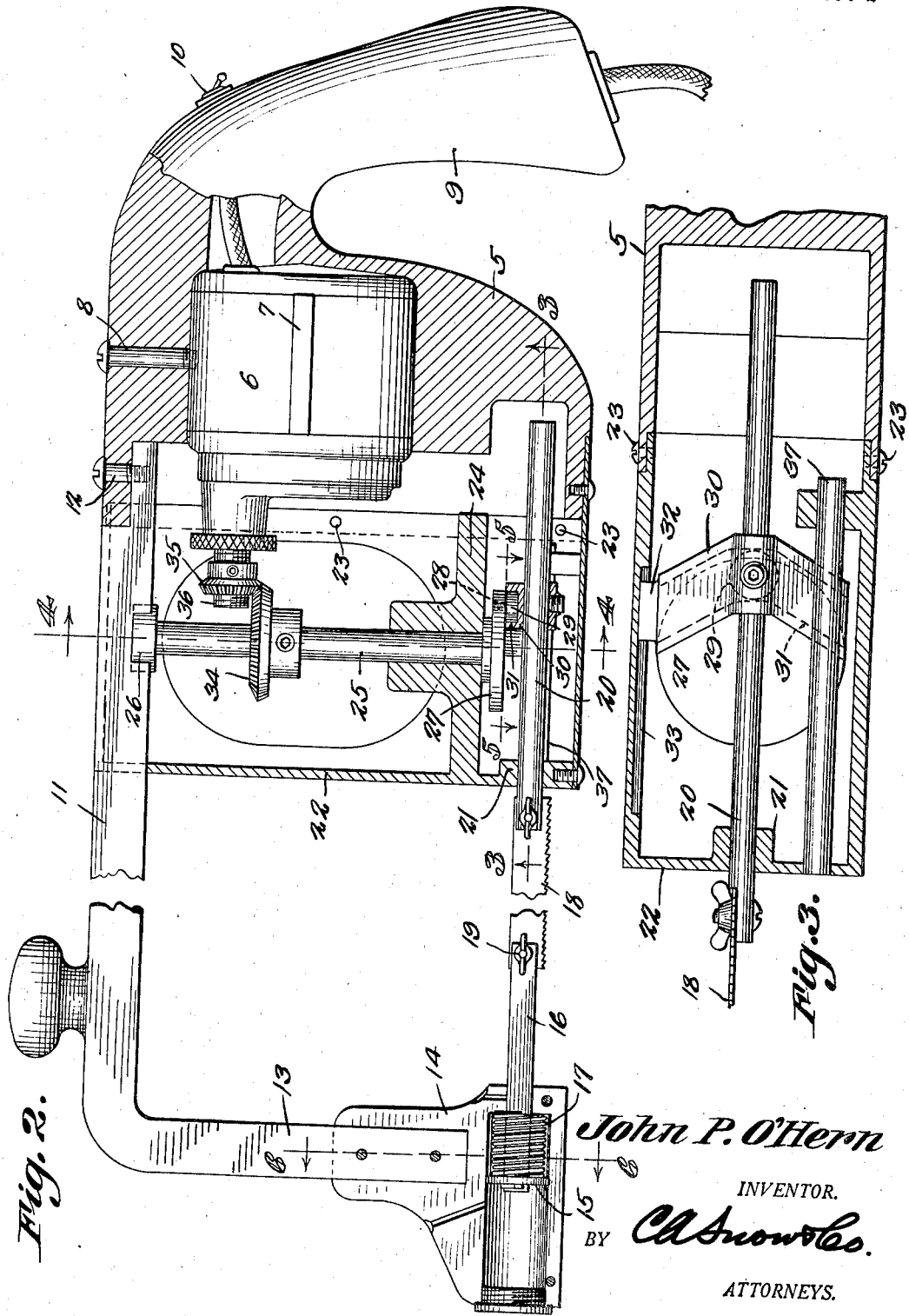

Patented July 2, 1940

2,206,614

UNITED STATES PATENT OFFICE 2,206,614

POWER HACK SAW

John P. O'Hern, Syracuse, N. Y.

Application August 5, 1939, Serial No. 288,650

2 Claims. (Cl. 29—73)

This invention relates to portable tools, the primary object of the invention being to provide a hand tool including a motor and motor support, so constructed that the motor and its support may be readily removed from the frame of the tool, and used as a drill by supplying the usual drill chuck and drill to the motor shaft thereof.

Another object of the invention is to provide means for converting rotary movement of the motor shaft to reciprocatory movement for operating the blade of a hack saw, the gearing being such as to insure an even and direct power being directed to the saw blade of the tool.

A still further object of the invention is to provide means for balancing the movement of the saw blade, to the end that vibrations of the saw blade are eliminated.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a side elevational view of a tool constructed in accordance with the invention and illustrating the motor and its support as forming a part of a hack saw structure.

Figure 2 is an enlarged elevational view of the tool, illustrating the motor support and portions of the frame of the tool as in section.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a sectional view taken on line 6—6 of Figure 2.

Referring to the drawings in detail, the reference character 5 designates the motor support, which is provided with a recessed portion for the reception of the motor 6, the wall of the recessed portion being formed with keyways for the reception of the keys 7 formed on the sides of the motor 6, the keys contacting with the walls of the grooves, to prevent rotary movement of the motor within the recess, and at the same time insure the proper positioning of the motor within the motor support.

A securing screw indicated by the reference character 8 extends through an opening of the support, and has its inner threaded end seated in a threaded opening of the motor casing, insuring against movement of the motor with respect to its support.

The motor support includes a handle of the pistol-grip type indicated at 9, the handle being provided with a switch 10 so that the electric current to the motor 6 may be readily controlled.

The frame of the tool includes an upper bar 11 that is secured to the front end of the motor support 5, by means of the screw 12, the forward end of the bar 11 extending downwardly as at 13, where it provides a support for the bearing member 14, which is shown as bolted to the downwardly extended end of the bar. This bearing member 14 is hollow providing a cylinder for the washer 15 carried at the forward end of the saw rod 16 which is shown as operating through a bearing opening formed in the bearing member 14. A coiled spring indicated at 17 is mounted within the cylinder formed in the bearing member 14, and is disposed between the washer 15 and one end of the cylinder, to the end that when the saw rod 16 moves in one direction, the spring will be compressed, to urge the saw rod 16 in the opposite direction. It will be seen that this spring cushions the movement of the saw rod 16 and insures smooth running of the saw.

The saw which is indicated at 18 is connected to one end of the saw rod 16, by means of the bolt 19, the opposite end of the saw being connected to the rod 20 that moves through the bearing 21 formed within the gear housing, which forms a part of the frame of the tool. The gear housing is indicated by the reference character 22 and is of a construction to fit over the forward end of the motor support 5, where it is held in position by means of the screws 23.

Formed within the gear housing 22 is a partition 24 which is provided with a bearing to accommodate the vertical shaft 25 that has its upper end operating in the bearing 26, the lower end of the shaft 25 extending through the partition 24, where it is supplied with a disk 27. Extending from the disk 27 is an eccentrically disposed pin 28 on which the roller 29 is mounted, the roller 29 operating within the member 30 which is formed with a cam groove 31. This member 30 is provided with an extension 32 at one end thereof, the extension 32 operating in the groove 33 formed in the inner surface of the gear housing 22, so that movement of the member 30 is guided in a true horizontal plane at all times.

As clearly shown by Figure 2 of the drawings, the member 32 is secured to the rod 20, to the end that as the disk 27 is rotated, the pin 28 and roller carried thereby, operating in the cam groove, will cause the rod 20 to reciprocate and operate the saw blade 18 connected therewith.

Secured to the shaft 25, is a pinion 34 that meshes with the pinion 35 removably secured to the motor shaft 36.

The member 30 also moves under the guide rod 37 that is mounted in the lower portion of the gear housing, further securing the member 30 against vibrating while in operation.

From the foregoing it will be seen that due to the construction shown and described, I have provided a hand tool which may be readily and easily disassembled, and the motor together with its support used in the capacity of a drill, by merely removing the gear 35 and replacing the gear with the usual drill chuck and drill bit.

What is claimed is:

1. A motor operated saw comprising a frame, a gear housing at one end of the frame, said gear housing having an open end, a motor support including a handle, adapted to extend into the open end of the gear housing, means for connecting the motor support within the gear housing, a motor in the motor support, said motor including a shaft, a pinion on the forward end of the shaft, a vertical shaft within the gear housing, a pinion on the vertical shaft rotating in a horizontal plane, the pinion on the motor shaft adapted to mesh with the pinion on the vertical shaft when the motor support is positioned adjacent to the gear housing, a reciprocating saw blade carrying rod mounted within the gearing housing, and means for transmitting movement of the vertical shaft to the reciprocating rod, operating the rod and saw blade carried thereby.

2. A motor-operated saw comprising a frame, an open-ended gear housing at one end of the frame, a motor support including a handle having a recess adapted to extend into the gear housing, a motor including a motor shaft mounted within the recess, a reciprocating rod mounted within the gear housing and to which a saw blade is secured, a member having a cam groove, secured to the rod, the groove being disposed upwardly, a vertical shaft mounted within the gear housing, a disk having a pin extending therefrom, mounted on the lower end of the vertical shaft, a roller on said pin operating in the cam groove, whereby rotary movement of the disk produces a reciprocating movement of the rod and saw carried thereby, and means for transmitting rotary movement of the motor shaft to said vertical shaft.

JOHN P. O'HERN.